(12) United States Patent
Maruyama

(10) Patent No.: US 10,666,074 B2
(45) Date of Patent: May 26, 2020

(54) ELECTRONIC DEVICE, BATTERY REMAINING AMOUNT MANAGEMENT METHOD, AND RECORDING MEDIUM

(71) Applicant: CASIO COMPUTER CO., LTD., Tokyo (JP)

(72) Inventor: Hirohisa Maruyama, Fuchu (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 178 days.

(21) Appl. No.: 15/394,883

(22) Filed: Dec. 30, 2016

(65) Prior Publication Data

US 2017/0288433 A1   Oct. 5, 2017

(30) Foreign Application Priority Data

Mar. 1, 2016 (JP) ................................. 2016-038915

(51) Int. Cl.
*H02J 7/00* (2006.01)

(52) U.S. Cl.
CPC ............ *H02J 7/0047* (2013.01); *H02J 7/007* (2013.01); *H02J 7/00034* (2020.01); *H02J 7/0048* (2020.01)

(58) Field of Classification Search
CPC ................................ H02J 7/007; H02J 7/0047
USPC ........................................................ 320/134
See application file for complete search history.

(56) References Cited

U.S. PATENT DOCUMENTS

| 2006/0164039 | A1* | 7/2006 | Ukon | G01R 31/3648 |
| | | | | 320/132 |
| 2007/0114971 | A1* | 5/2007 | Uesaka | G01R 31/3842 |
| | | | | 320/132 |
| 2013/0194896 | A1* | 8/2013 | Kato | G04G 19/06 |
| | | | | 368/66 |
| 2016/0057268 | A1* | 2/2016 | Jiang | H04B 5/00 |
| | | | | 455/556.1 |

FOREIGN PATENT DOCUMENTS

| CN | 103901769 A | 7/2014 |
| CN | 105005002 A | 10/2015 |
| JP | 2002-270248 A | 9/2002 |
| JP | 2013-006325 A | 1/2013 |
| JP | 2013-156160 A | 8/2013 |
| JP | 2015-004567 A | 1/2015 |

(Continued)

OTHER PUBLICATIONS

Notification of Refusal dated Sep. 5, 2017 received in Japanese Patent Application No. JP 2016-038915 together with an English language translation.

(Continued)

*Primary Examiner* — Zixuan Zhou
(74) *Attorney, Agent, or Firm* — Scully Scott Murphy & Presser

(57) ABSTRACT

An electronic device includes a display and a controller. The controller obtains time series information regarding an output voltage of a battery; estimates a battery remaining amount which the battery is able to discharge based on the obtained time series information; and controls the display to perform a predetermined display when the estimated battery remaining amount is less than a predetermined reference remaining amount.

15 Claims, 11 Drawing Sheets

(56) References Cited

FOREIGN PATENT DOCUMENTS

JP          2015-135347 A      7/2015

OTHER PUBLICATIONS

First Office Action dated Aug. 1, 2019 received in Chinese Patent Application No. CN 201710097124.X together with an English language translation.
Notice of Reasons for Refusal dated Jan. 7, 2020 received in Japanese Patent Application No. JP 2017-232303 together with an English language translation.

* cited by examiner

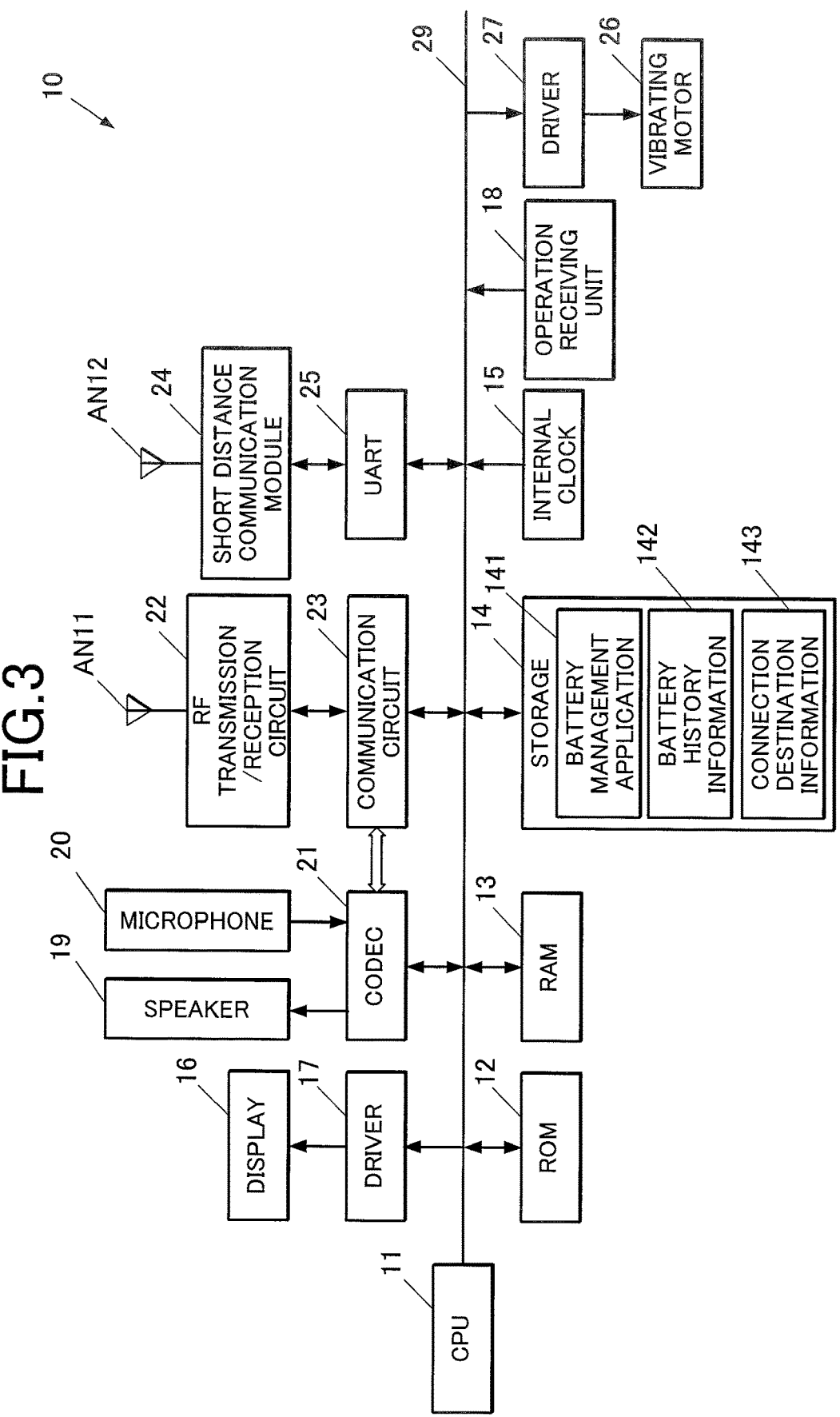

FIG.4

| COMMUNICATION CONNECTION TYPE | OPERATION CONTENTS | CONNECTION START | CONNECTION CANCEL |
|---|---|---|---|
| MANUAL CONNECTION | PROCESS ACCORDING TO OPERATION | MANUAL | MANUAL INPUT OPERATION |
| DATE/TIME INFORMATION OBTAINING | TIME CORRECTION | AUTOMATIC /MANUAL | DATE/TIME INFORMATION OBTAINING |
| TERMINAL SEARCH | TERMINAL NOTIFICATION OPERATION | MANUAL | 30 SECONDS PASS MANUAL INPUT OPERATION |

FIG.5A

| NO. | BATTERY LEVEL VALUE, BLD | ESTIMATE LEVEL | LOWER LIMIT | UPPER LIMIT |
|---|---|---|---|---|
| 1 | 0x18 | FULL | VF | --- |
| 2 | 0x17 | HIGH | VM1 | VF |
| 3 | 0x16 | MID-1 | VM2 | VM1 |
| 4 | 0x15 | MID-2 | VM2 | VM2 |
| 5 | 0x14 | MID-3 | VL1 | VM3 |
| 6 | 0x13 | LOW-1 | VL2 | VL1 |
| 7 | 0x12 | LOW-2 | VC | VL2 |
| 8 | 0x11 | CHARGE | --- | VC |

FIG.5B

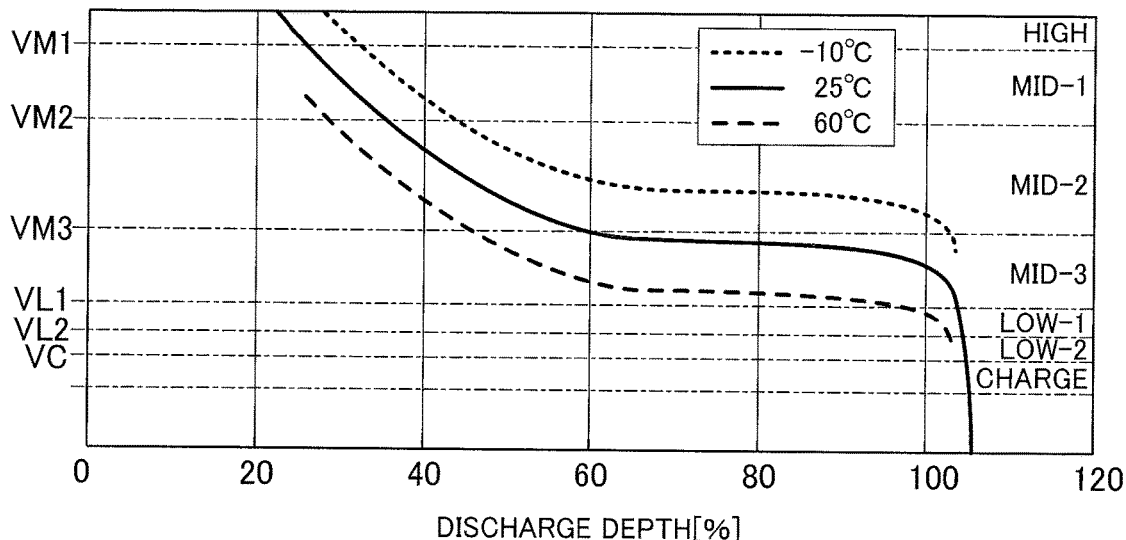

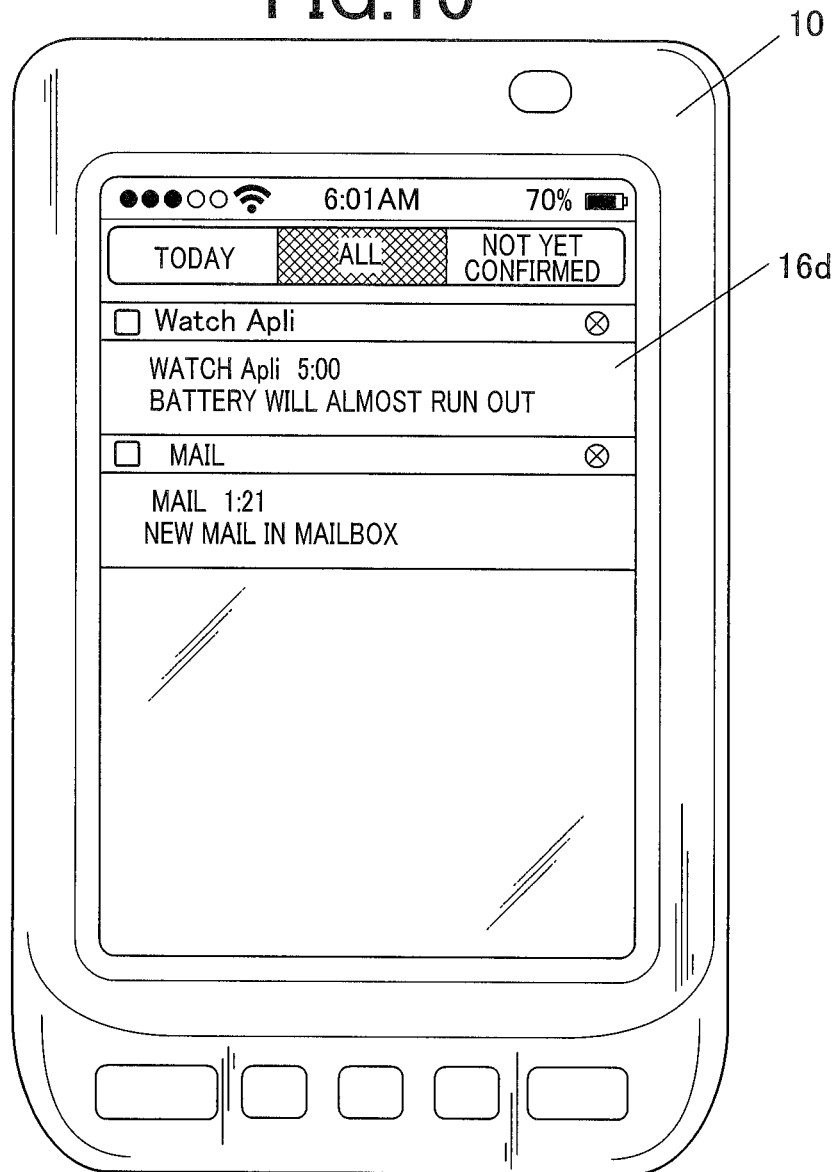

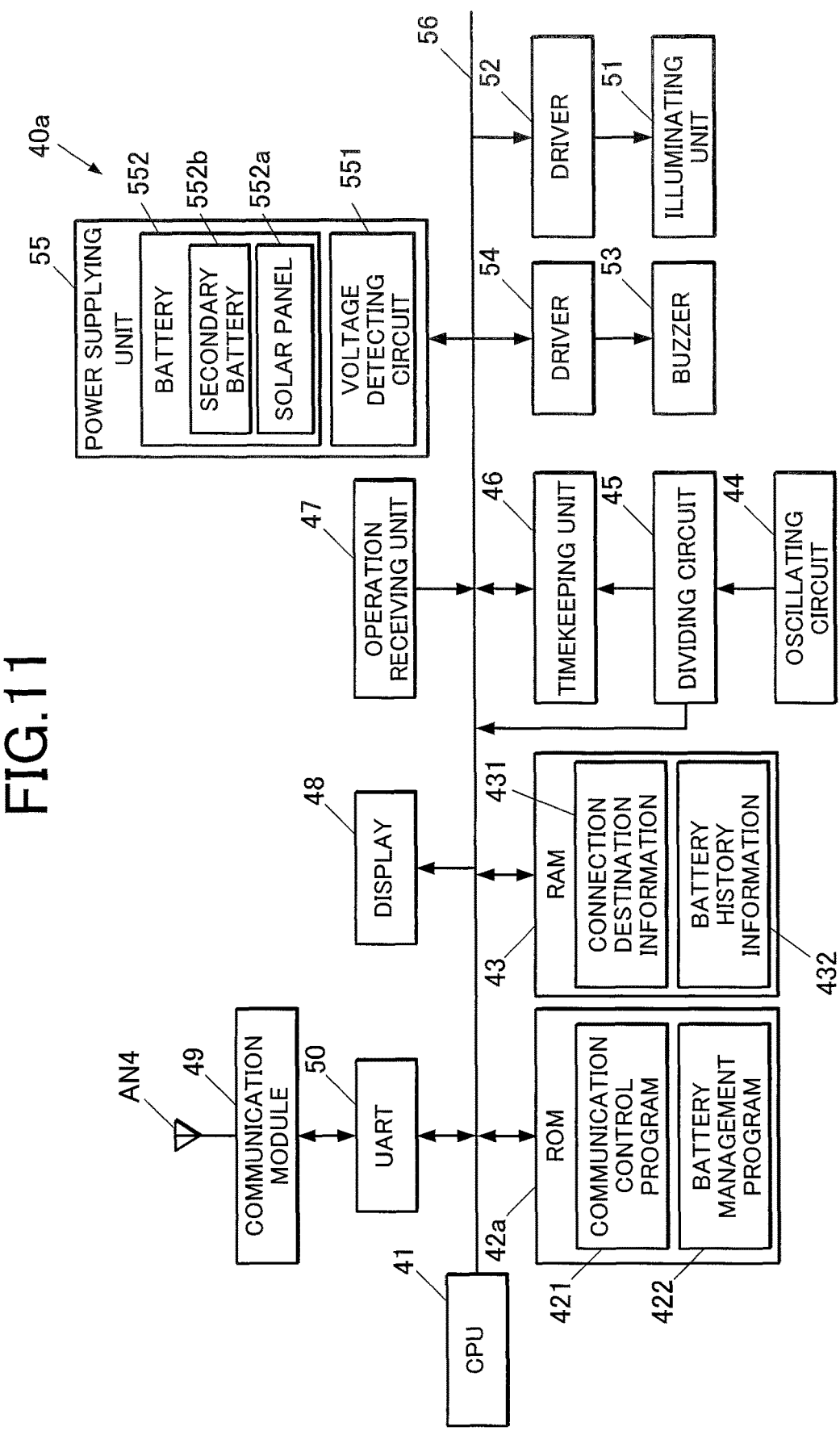

ELECTRONIC DEVICE, BATTERY REMAINING AMOUNT MANAGEMENT METHOD, AND RECORDING MEDIUM

BACKGROUND OF THE INVENTION

1. Field of the Invention

The present invention relates to an electronic device which manages a remaining amount of a battery, a battery remaining amount management method and a recording medium

2. Description of the Related Art

Conventionally, there is an electronic device which receives power supply from a battery such as a dry battery or a rechargeable battery. Such dry battery and rechargeable battery are often used in electronic devices such as portable electronic devices or small electronic devices which have difficulty in receiving power supply from a fixed or large external power source such as a plug socket or a generator.

Such electronic devices may include a function to estimate and display the remaining amount of the battery and to urge exchange of the battery or recharging on the display. As for an electronic device which operates continuously, it is preferable to prepare the dry battery for exchange or to recharge the rechargeable battery before the remaining amount of the dry battery or the rechargeable battery lacks, the voltage reduces, and the actual operation of the electronic device becomes impossible. In such electronic devices, there is a demand to suitably show a level before the remaining amount of the battery lacks.

However, it is difficult to directly measure the remaining amount of the battery. In view of the above, conventionally, there is a technique to indirectly estimate the remaining amount of the battery using the output voltage of the battery. Japanese Patent Application Laid-Open Publication No. 2015-135347 discloses an electronic timepiece in which the output voltage value is divided in a plurality of levels, and the display level of the indicator and the level of limiting the operation are changed for each level of the output voltage. With this, the remaining amount of the battery is notified to the user.

However, the battery used in the electronic device is normally maintained at an output voltage higher than the lower limit voltage in which the electronic device can be operated compared to the increase of the consumption amount of power for a relatively long period of time without greatly decreasing. Moreover, the output voltage of the battery is influenced by the surrounding environment such as the temperature. Therefore, it is difficult to suitably display the remaining amount of the battery at a suitable timing in the level before the remaining amount of the battery lacks by merely dividing the output voltage at the measured point of time into a plurality of levels.

SUMMARY OF THE INVENTION

The present invention is an electronic device, a battery remaining amount management method and a recording medium which is able to more suitably display information regarding the lack of the remaining amount of the battery before the remaining amount of the battery lacks.

According to an aspect of the present invention, there is provided an electronic device including, a display; and a controller, wherein, the controller, obtains time series information regarding an output voltage of a battery; estimates a battery remaining amount which the battery is able to discharge based on the obtained time series information; and controls the display to perform a predetermined display when the estimated battery remaining amount is less than a predetermined reference remaining amount.

BRIEF DESCRIPTION OF THE DRAWINGS

FIG. 3 is a block diagram showing a functional configuration of a smartphone.

FIG. 4 is a table showing type of communication connection request made in the electronic timepiece.

FIG. 5A is a table showing classification of BLD.

FIG. 5B is a diagram showing a relation between an output voltage and a battery use amount.

FIG. 10 is a diagram showing a display example on a display screen of the display of the smartphone.

FIG. 11 is a block diagram showing a functional configuration of an electronic timepiece of a second embodiment.

DETAILED DESCRIPTION OF THE PREFERRED EMBODIMENTS

An embodiment of the present invention is described with reference to the drawings.

First Embodiment

Figure 1:
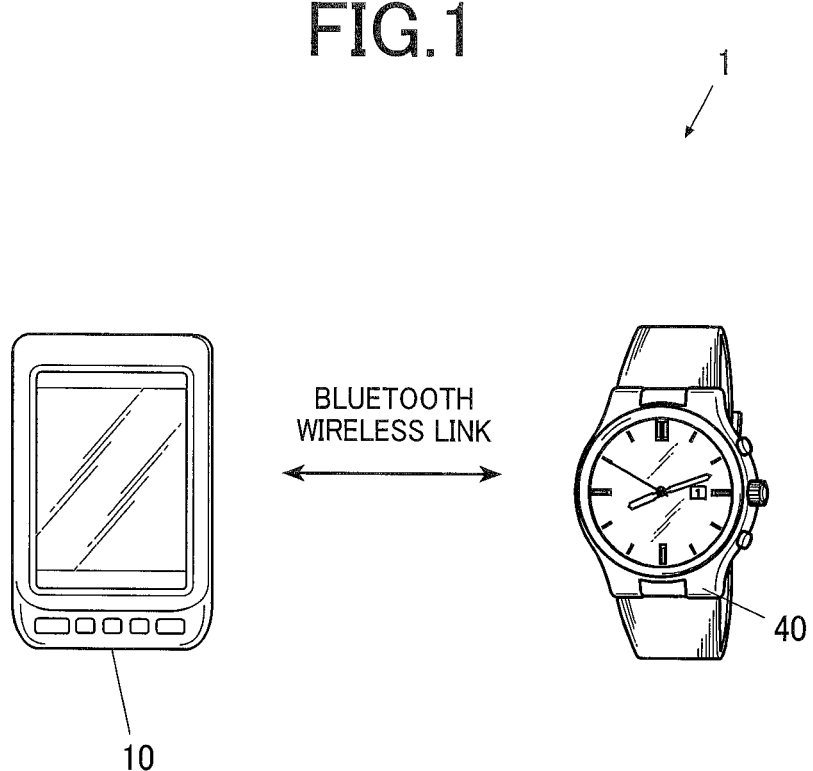
FIG. 1 is a diagram showing an entire configuration of a communication system including an electronic device and an electronic timepiece of an embodiment of the present invention.

FIG. 1 is a diagram showing an entire communication system 1 including an electronic timepiece and an external electronic device of the first embodiment.

The communication system transmits and receives information by connection of communication one-to-one using short distance wireless communication such as Bluetooth (registered trademark) between an electronic timepiece 40 (an external device to a smartphone 10) and an electronic device such as a smartphone 10 (predetermined external device to an electronic timepiece 40).

Figure 2:
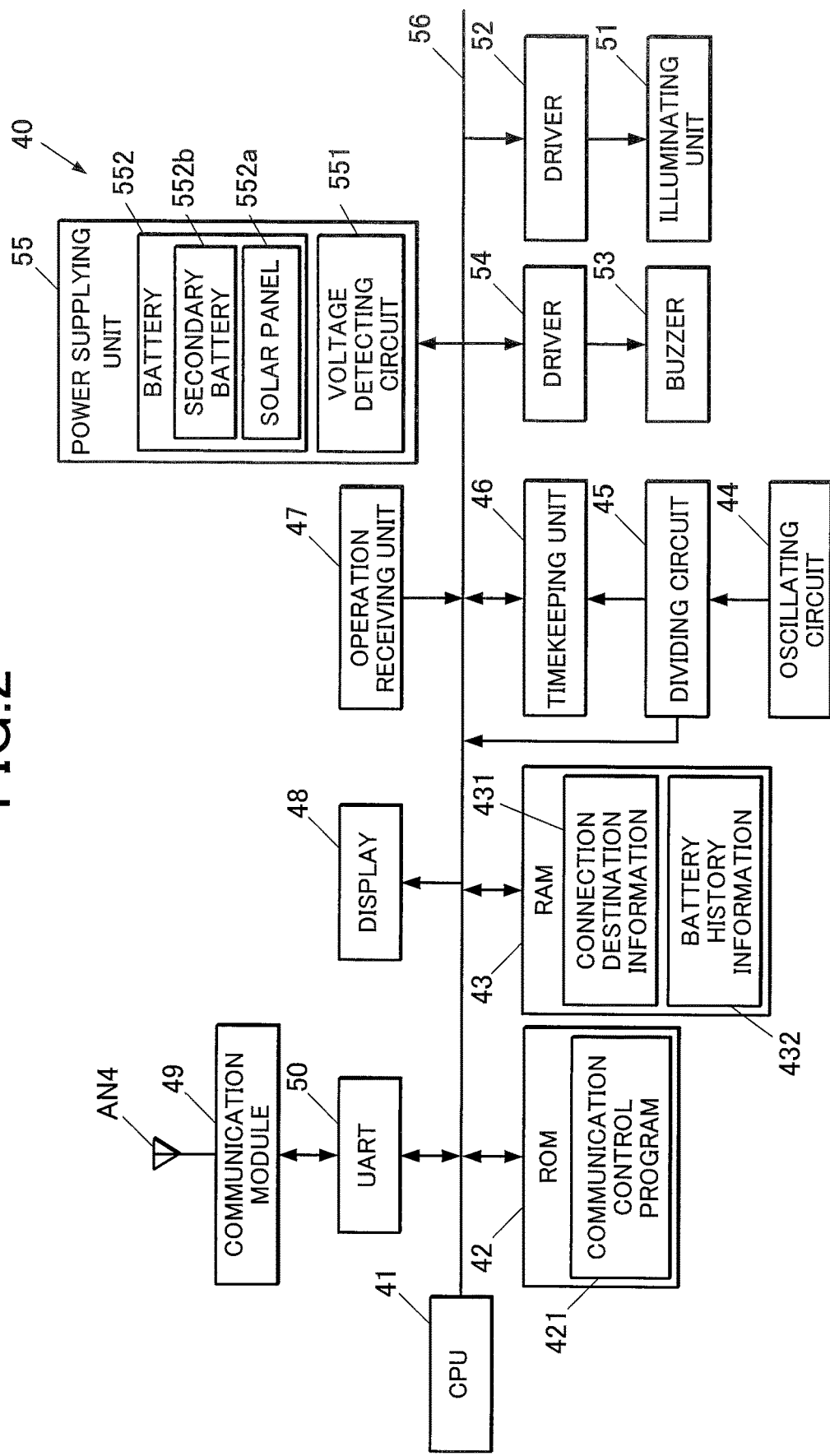
FIG. 2 is a block diagram showing a functional configuration of an electronic timepiece of the first embodiment.

FIG. 2 is a block diagram showing a functional configuration of the electronic timepiece 40 of the present embodiment.

The electronic timepiece 40 includes a CPU 41 (Central Processing Unit) (controller), a ROM 42 (Read Only Memory), a RAM 43 (Random Access Memory) (voltage information storage), an oscillating circuit 44, a dividing circuit 45, a timekeeping unit 46, an operation receiving unit 47, a display 48, a communication module 49 (communicator) and an antenna AN4, a UART 50 (Universal Asynchronous Receiver/Transmitter), an illuminating unit 51 and its driver 52, a buzzer 53 and its driver 54, a power supplying unit 55, and a bus 56.

The CPU 41 is a processor which performs various computing processing and centrally controls the entire operation of the electronic timepiece 40. The CPU 41 reads and executes various programs regarding the operation of the electronic timepiece 40 from the ROM 42. When the CPU 41 obtains a measuring value of voltage from a voltage detecting circuit 551 of the power supplying unit 55, the CPU 41 converts a later described battery level data value (BLD value; voltage level) set in advance for each predetermined output voltage range to the measuring value and updates battery history information 432 of the RAM 43. Alternatively, the voltage detecting circuit 551 may convert the measuring value to the BLD value and output the value. The CPU 41 performs control such as limiting the operation of each unit of the electronic timepiece 40 according to the obtained BLD value.

The ROM 42 stores various control programs regarding the operation of the electronic timepiece 40 and initial setting data. Examples of such control programs include a communication control program 421 to perform communication with the smartphone 10.

The RAM 43 provides a working memory space to the CPU 41 and stores temporary data and various setting data. The setting data stored in the RAM 43 includes connection destination information 431 which is information regarding the external device which is the communication connection party communicating with the electronic timepiece 40 by Bluetooth and battery history information 432 which holds in an array time series data of the BLD value (time series information regarding output voltage) according to the measuring value by the voltage detecting circuit 551 of the output voltage from a battery 552 of the power supplying unit 55. Here, the battery history information 432 is able to store later-described 2 byte data regarding measurements for a maximum of 12 times (plurality of times) as array data with a maximum of 12 pieces of 2 byte data. That is, as described later, when the BLD value is obtained every 8 hours, BLD values for a maximum of 4 days (maximum obtainable time) are stored as the battery history information 432. The setting data may include setting regarding local time for the date/time displayed on the display 48, that is, information regarding the time zone or whether summer time is employed.

The oscillating circuit 44 generates a predetermined frequency signal and outputs the signal. The dividing circuit 45 divides the frequency output by the oscillating circuit 44 to a signal with a frequency suitable for use in the electronic timepiece 40 and outputs the signal.

The timekeeping unit 46 is a counter which counts the present date/time by counting input of the signal input from the diving circuit 45 and adding the input number to the initial date/time data and holds the present date/time. The timekeeping unit 46 is not limited to the counter as hardware and may include storing the present date/time calculated under control of the CPU 41 as in software.

The timekeeping unit 46 may count a unique value which can be converted to the present date/time such as UTC based on a predetermined reference and may convert the value to a UTC date/time or to a local time in a city set as the present position. Alternatively, the UTC date/time or the local time of the present position may be directly counted. Alternatively, a uniquely measured value may be counted by hardware such as a counter, and the converted UTC date/time or local date/time may be stored in the RAM. The RAM may be the same as the RAM 43 or may be provided separately.

The operation receiving unit 47 includes a press button switch or a winding knob as a mechanism to receive input from outside. The operation receiving unit 47 generates an electric signal according to the input operation by the user and outputs the signal as an input signal to the CPU 41. According to user operation on the operation receiving unit 47, for example, communication connection with external devices (including devices regarding operation to search for terminals) can be manually performed or released.

The display 48 displays the time and other various information selectively or in parallel. The display 48 may be a liquid crystal display screen and its driver to display a digital display on the liquid crystal display screen. Alternatively, the display 48 may be a display in which a plurality of hands provided rotatably on a plate with characters rotate with a gear driven to rotate by a stepping motor based on a signal from the driving circuit to show a display according to the position of the hands in relation with the plate with characters.

The communication module 49 is a control module to perform Bluetooth communication (wireless communication) with external devices such as a smartphone 10 through an antenna AN 4. The transmitting data transmitted from the CPU 41 goes under processing in the UART 50 such as serial/parallel conversion, and the data is transmitted to external devices from the communication module 49. The receiving data received by the antenna AN 4 and the communication module 49 goes under processing in the UART 50 such as serial/parallel conversion and the data is output to the CPU 41.

The illuminating unit 51 illuminates the plate with characters in the electronic timepiece 40 according to a driving voltage output from the driver 52 under a control signal from the CPU 41. For example, an LED (light emitting diode) is used as the illuminating unit 51. The buzzer 53 generates a buzzer sound (beeping sound) according to the driving signal output from the driver 54 according to the control signal from the CPU 41. For example, a method of combining a piezoelectric element with a metal plate and vibrating a metal plate according to voltage applied to the piezoelectric element can be employed as the mechanism to generate the buzzer sound.

The power supplying unit 55 includes a voltage detecting circuit 551 (voltage measuring unit) and a battery 552. The power supplying unit 55 supplies electric power to operate each section of the electronic timepiece 40 such as the CPU 41, measures the output voltage with the voltage detecting circuit 551, and outputs the measuring value to the CPU 41. A solar panel 552a and a secondary battery 552b are used as the battery 552. When the generated electromotive force by the solar panel 552a is high compared to the output voltage, the secondary battery 552b is charged while supplying electric power to each unit. When the generated electromotive force is not enough, power is discharged from the secondary battery 552b to supply power to each section. The remaining amount of the battery which can be discharged from the secondary battery 552b depends on the status such as the charging state by the solar panel 552a to the secondary battery 552b. However, capacity of power which can be discharged by the secondary battery 552b from the fully charged state to when the output voltage necessary to operate the electronic timepiece 40 cannot be maintained without charging is basically fixed, and for example, the continuous operation time of the electronic timepiece 40 according to the discharging capacity is about a few months.

The bus 56 is a communication path connecting the CPU 41 with each unit to exchange communication information.

FIG. 3 is a block diagram showing a functional configuration of a smartphone 10.

The smartphone 10 includes a CPU 11 (controller) a ROM 12, a RAM 13, a storage 14, an internal clock 15, a display 16 and its driver 17, an operation receiving unit 18, a speaker 19, a microphone 20, a codec 21, a RF transmission/reception circuit 22, a RF communication radio wave transmission/reception antenna AN 11, a communication circuit 23, a short distance communication module 24 (communicator), a UART 25, a short distance wireless communication (Bluetooth) radio wave transmission/reception antenna AN 12, a vibrating motor 26 and its driver 27, and a bus 29.

The CPU 11 is a processor which performs various computing processing and centrally controls the entire operation of the smartphone 10. The CPU 11 uses a battery management application 141 to connect communication by Bluetooth between the smartphone 10 and the electronic timepiece 40, and performs operation of management and display of the state of the battery of the electronic timepiece 40.

The ROM 12 stores various programs performed by the CPU 11 and initial setting data. At least a portion of the ROM 12 may be a rewritable nonvolatile memory.

The RAM 13 is a volatile memory which provides a working memory space in the CPU 11 and stores temporary data for working.

The storage 14 includes a nonvolatile memory which is readable and writable such as a flash memory or EEPROM (Electrically Erasable and Programmable Read Only Memory). The data stored in the storage 14 includes a battery management application 141 (program), battery history information 142, and connection destination information 143. When the battery management application 141 is read out and executed by the CPU 11, the CPU 11 obtains the battery history information 432 from the electronic timepiece 40 set in the connection destination information 143, updates the battery history information 142, and analyzes and determines the battery remaining amount of the battery 552 in the electronic timepiece 40 based on the latest battery history information 142. The CPU 11 controls the display 16 to perform various display including the state of the battery 552 of the electronic timepiece 40.

The storage 14 stores information regarding the display of the time set in the electronic timepiece 40, for example, time zone setting of the time to be displayed, and local time setting information such as setting regarding whether summer time is employed.

Here, the battery history information 142 is able to hold an array of a maximum of 12 BLD values as in the battery history information 432. Alternatively, the battery history information 142 may hold more than 12 BLD values to be used in the analysis of the remaining amount of the battery.

The internal clock 15 is a counter which counts and holds the present time. The present time can be counted as in software by operation of the CPU 11 and stored in the RAM. The internal clock 15 includes a RTC (Real Time Clock), and when the power of the smartphone 10 is turned off and then started again, the internal clock 15 obtains date/time data from the RTC to start counting again. The smartphone 10 reads the present time of the internal clock 15, and calculates the local time as necessary according to the setting of the time zone and whether summer time is employed. The result is displayed on the display 16 and used in various processing. Further, the present time is compared with the setting time in various functions to perform various operation. The present time data of the internal clock 15 is corrected by the time data obtained from a base station when the RF transmission/reception circuit 22 communicates with the base station for mobile phone communication.

The display 16 includes the display screen which performs various display. For example, a liquid crystal display (LCD) is used as a display screen. The driver 17 (liquid crystal driver), which is operated by a control signal transmitted from the CPU 11, drives the LCD according to the control signal to display various functions on the display screen. The display 16 may include a display screen with another display method such as an organic ELD (Electro-Luminescent Display), and the driver 17 is suitably selected according to the display method of the display screen. The display 16 may also include an LED lamp.

The operation receiving unit 18 includes a touch panel. The operation receiving unit 18 detects the position and the content of operation touched by the user on the touch panel provided overlapping the display screen of the display 16, generates an electric signal according to the operation and outputs the signal as the input signal to the CPU 11. The operation receiving unit 18 may also further include one or a plurality of operation keys and switches, and the input signal based on the operation of the operation keys and the switches by the user may be output to the CPU 11.

The speaker 19 converts the electric signal to a sound signal based on the signal from the codec 21 to output sound. The microphone 20 detects a sound wave to be converted to an electric signal, and outputs the electric signal to the codec 21. The codec 21 decodes an encoded and compressed digital sound signal and transmits the sound signal as an analog signal to the speaker 19. The codec 21 also encodes the sound signal obtained from the microphone 20 and outputs the above to the CPU 11 and the communication circuit 23. The speaker for telephone communication and the speaker to externally output other notifying sound can be provided separately.

The RF transmission/reception circuit 22 performs processing of transmission/reception of signals regarding telephone communication and data communication with the base station for mobile phone communication through the antenna AN 11 for transmission/reception of RF communication. The communication circuit 23 performs various processing regarding transmitting and receiving data transmitted and received by the RF transmission/reception circuit 22 and exchanges data with the CPU 11 or the codec 21. The RF transmission/reception circuit 22 is connected to an access point of a wireless LAN, and is able to transmit and receive data (data communication) with various locations on the Internet including an external data server through the wireless LAN.

The short distance communication module 24 is a control module to perform short distance wireless communication with external devices such as an electronic timepiece 40 through the antenna AN 12, and here performs bidirectional communication one-to-one by Bluetooth. Alternatively, the communication can be performed one-to-many. The transmitting data transmitted from the CPU 11 goes under processing such as serial/parallel conversion by the UART 25, and the data is transmitted to the external device from the short distance communication module 24. The receiving data received from external devices using the short distance communication module 24 goes under processing such as parallel serial conversion by the UART 25, and the data is output to the CPU 11.

The oscillating motor 26 oscillates as notification to the user. When the CPU 11 transmits a control signal to the driver 27, the driver 27 converts the control signal to the voltage signal necessary to operate the oscillating motor 26, and outputs the signal. For example, a rotating motor is used as the oscillating motor 26.

A bus 29 is a data path connected to be able to transmit and receive signals with the CPU 11 and various components in the smartphone 10.

Next, the communication connection operation between the electronic timepiece 40 and the smartphone 10 of the present embodiment is described.

The electronic timepiece 40 of the present embodiment performs communication connection one-to-one by Bluetooth with the smartphone 10 based on the connection destination information 431, and is able to transmit and receive data. The communication connection transmits a connection request or a connection cancel request from the electronic timepiece 40 side so that the connection request is accepted by the smartphone 10 to establish connection for communication and the connection is continued until the connection cancel request is accepted by the smartphone 10 and the connection for communication is canceled.

FIG. 4 is a table showing types of communication connection request mainly made in the electronic timepiece 40 of the present embodiment.

As timing to perform communication connection, in addition to manual connection at an arbitrary timing based on the predetermined input operation to the operation receiving unit 47 of the user, communication connection regarding date/time obtaining operation is performed automatically a predetermined number of times in one day, here, 4 times at a predetermined time such as 5, 11, 17, and 23 on the hour so that the electronic timepiece 40 obtains information of the accurate present date/time from the smartphone 10. Moreover, communication connection regarding the terminal searching operation is performed based on the predetermined input operation to the operation receiving unit 47 by the user to communicate with the smartphone 10 so that the smartphone 10 performs predetermined notifying operation. The communication connection regarding the terminal searching operation is canceled manually when the user gives a predetermined stopping instruction on the smartphone 10 or automatically when a predetermined amount of time such as 30 seconds passes after the notifying operation starts.

Among the above, in the manual connection and in the first connection of the day in the automatic communication connection regarding the date/time obtaining operation, the above-described battery history information 432 is transmitted from the electronic timepiece 40 to the smartphone 10. That is, the smartphone 10 obtains the battery history information 432 at least once a day (every information update term). The frequency that the battery history information 432 is obtained is not limited to the above, but it is set so that the interval is equal to or shorter than the maximum obtainable time of the battery history information 432.

Next, the battery state detecting operation of the present embodiment is described.

FIG. 5A is a table showing a classification of the BLD. FIG. 5B is a diagram showing a relation between output voltage and battery use amount.

As shown in FIG. 5A, in the electronic timepiece 40, when the output voltage of the battery 552 is measured by the voltage detecting circuit 551, the output voltage is classified in 8 levels as the battery level value (BLD value) in 2 bytes and held. The range of the BLD value is divided into the reference voltages VF, VM1, VM2, VM3, VL1, VL2, VC, and in order from high voltage, the values 0x18 to 0x11 are set here. Here, as a battery remaining amount estimate level, "FULL", "HIGH", "MID-1", "MID-2", "MID-3", "LOW-1", "LOW-2", and "CHARGE" are set corresponding to the BLD values 0x18 to 0x11.

As shown in FIG. 5B, when the operation regarding normal time counting and display starts on the electronic timepiece 40 with the battery 552 fully charged, due to the characteristic of the secondary battery, after the voltage decreases slightly, the electric power consumption (discharge from the battery 552) continues for a while with little decrease of voltage, and then depth of discharge (here, value with respect to nominal capacity, actually, the capacity is larger than the nominal capacity) rises, that is, the battery remaining amount decreases. Then, when the depth of discharge rises even more, the output voltage starts to decrease again. After dropping below the voltage VC, the voltage drops below the lower limit voltage necessary for operation of the electronic timepiece 40 right before complete discharge, and the operation becomes impossible (below "CHARGE" level). Here, the reduction of output voltage is small compared to the operation time (difference of depth of discharge) at the "MID-3" level in which normal operation is possible and the "MID-3" level is maintained for a long period of time. On the other hand, the reduction of the output voltage is large compared to the operation time from the "LOW-2", "LOW-1" level to the "CHARGE" level, and the continuing time is very short compared to "MID-3".

The output voltage of the secondary battery changes according to the surrounding environment such as the temperature. The output voltage of the battery 552 used in the electronic device used in various environments such as the electronic watch may change as shown with a dotted line (here, −10° C. to 60° C.) with respect to the room temperature (25° C.) shown with a solid line. Specifically, in the term with the level "MID-3" which is a large percentage of the operation time (discharge depth), compared to the reduction of voltage according to the rise of the depth of discharge, the change in voltage according to the change in temperature is larger, and it is difficult to finely estimate the depth of discharge from the present output voltage.

In order to maintain stable operation of the electronic timepiece 40, it is necessary to display that charging is necessary well before the timing that the level becomes "CHARGE" and the operation stops. However, if the display showing that charging is necessary starts too early, such display will be made too frequently placing the burden on the user to perform unnecessary charging. That is, such display is too late when in the conventional "LOW-1" level but too early in the beginning of the "MID-3" level. The battery remaining amount of the electronic timepiece 40 of the present embodiment is managed by the smartphone 10, and in the smartphone 10, the battery remaining amount is estimated based on not only the present measuring value of the output voltage but also its time series information, that is, tendency of change of the BLD value in the array data, and the display start timing showing that charging is necessary is determined.

Figure 6A:
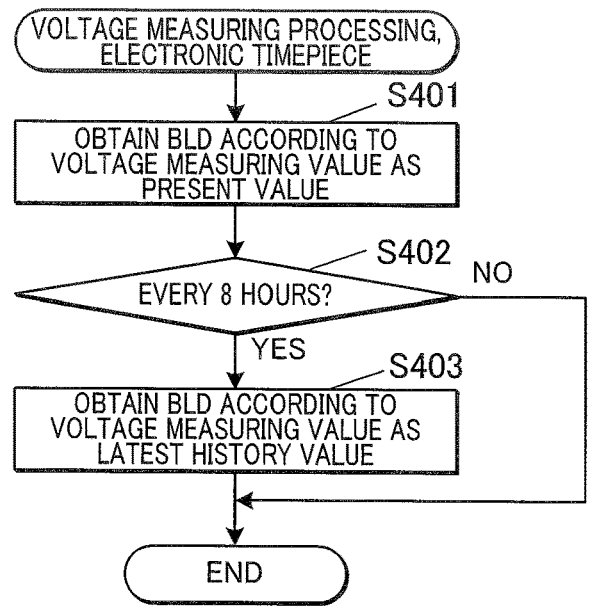
FIG. 6A is a flowchart showing a control procedure of voltage measuring processing regarding management of the battery in the electronic timepiece of the first embodiment.
Figure 6B:
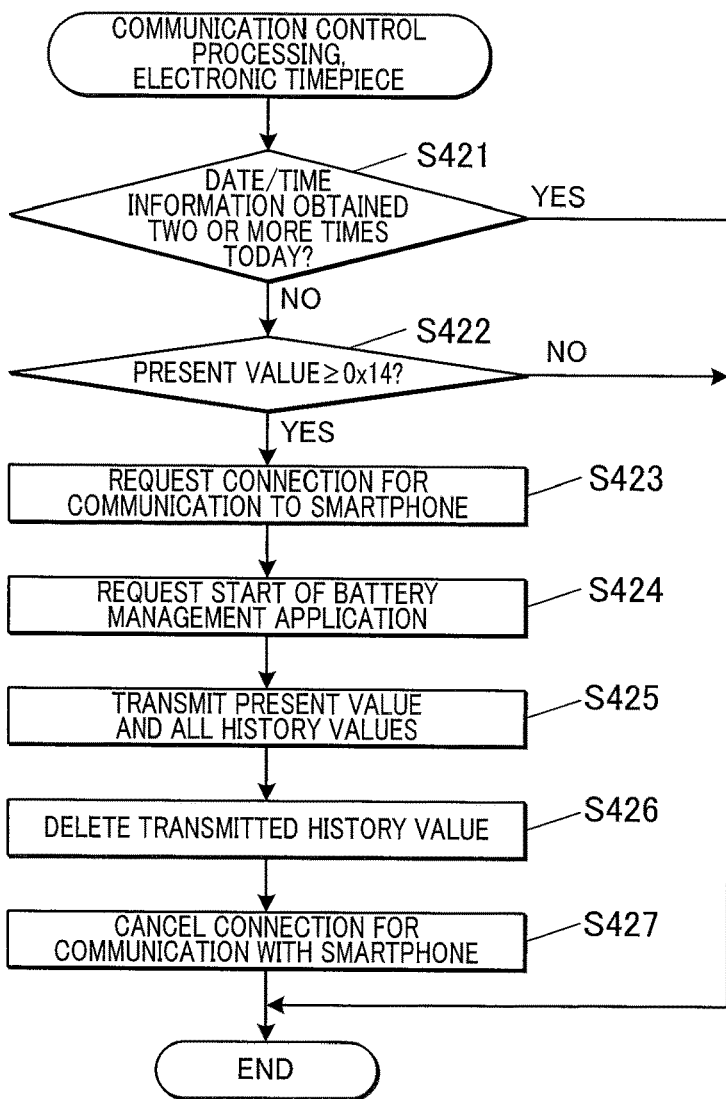
FIG. 6B is a flowchart showing a control procedure of communication control processing regarding management of the battery in the electronic timepiece of the first embodiment.

FIG. 6A and FIG. 6B are flowcharts showing a control procedure by the CPU 41 of the control processing regarding the battery management in the electronic timepiece 40 of the present embodiment.

FIG. 6A is a flowchart showing a control procedure of the voltage measuring processing.

The voltage measuring processing is performed automatically once every time a predetermined amount of time passes, such as 10 minutes. When the voltage measuring processing starts, the CPU 41 obtains the measuring value of the output voltage from the voltage detecting circuit 551, converts the value to the BLD value and stores the result as the present value (step S401). The CPU 41 determines whether the present date/time is the just timing of a predetermined timing of every 8 hours (predetermined time interval), for example 0, 8 and 16 on the hour (step S402). When it is determined that it is not the predetermined timing of every 8 hours ("NO" in step S402), the CPU 41 ends the voltage measuring processing. When it is determined that it is the predetermined timing of every 8 hours ("YES" in step S402), the CPU 41 obtains the measuring value of the output voltage again from the voltage detecting circuit 551, and stores the BLD value according to the obtained voltage value as the latest value of the battery history information 432 (step S403). Alternatively, the CPU 41 may copy the present value to be set as the latest value of the battery history information 432.

As described above, a maximum of 12 BLD can be stored in the battery history information 432, but when 12 pieces of data are already stored, the CPU 41 deletes the oldest data and moves the remaining data in the array position corresponding to the order or changes the top position information of the array to manage and hold the history data in FIFO (First-In First-Out).

Then, the CPU 41 ends the voltage measuring processing.

FIG. 6B is a flowchart showing a control procedure of the communication control processing.

The communication control processing is called and started automatically or manually in response to a date/time obtaining operation (communication connection for a predetermined purpose) and manual connection operation among the types of communication connection requests described above.

When the communication control processing starts, the CPU 41 determines whether the communication connection request is the date/time information obtaining operation performed for the second time or more for that day (step S421). When it is determined that the request is the date/time information obtaining operation made the second time or more for that day ("YES" in step S421), the CPU 41 ends the communication control processing.

When the type of communication connection request is not the date/time information obtaining operation made the second time or later for that day, that is, the first date/time information obtaining operation made the first time or the manual connection operation ("NO" in step S421), the CPU 41 determines whether the present value of the BLD value is 0x14 or more (step S422). When it is determined that the value is not 0x14 or more ("NO" in step S422), the battery remaining amount is already an amount in which the output voltage becomes lower than the lower limit value in which stable communication operation can be performed, and the CPU 41 ends the communication control processing.

When it is determined that the present value of the BLD value is 0x14 or more ("YES" in step S422), the CPU 41 refers to the connection destination information 431 and transmits the request for communication connection to the smartphone 10 which is the referred connection destination external device (step S423). When the communication connection (wireless communication connection) is established, the CPU 41 requests the start of the battery management application 141 to the smartphone 10 (step S424).

The CPU 41 transmits the present value and all history values stored in the battery history information 432 to the smartphone 10 (step S425). The CPU 41 deletes all of the battery history information 432 which has already been transmitted (step S426). The CPU 41 makes a communication connection cancel request to the smartphone 10 and cancels the communication connection (step S427). Then, the CPU 41 ends the communication control processing.

Figure 7:
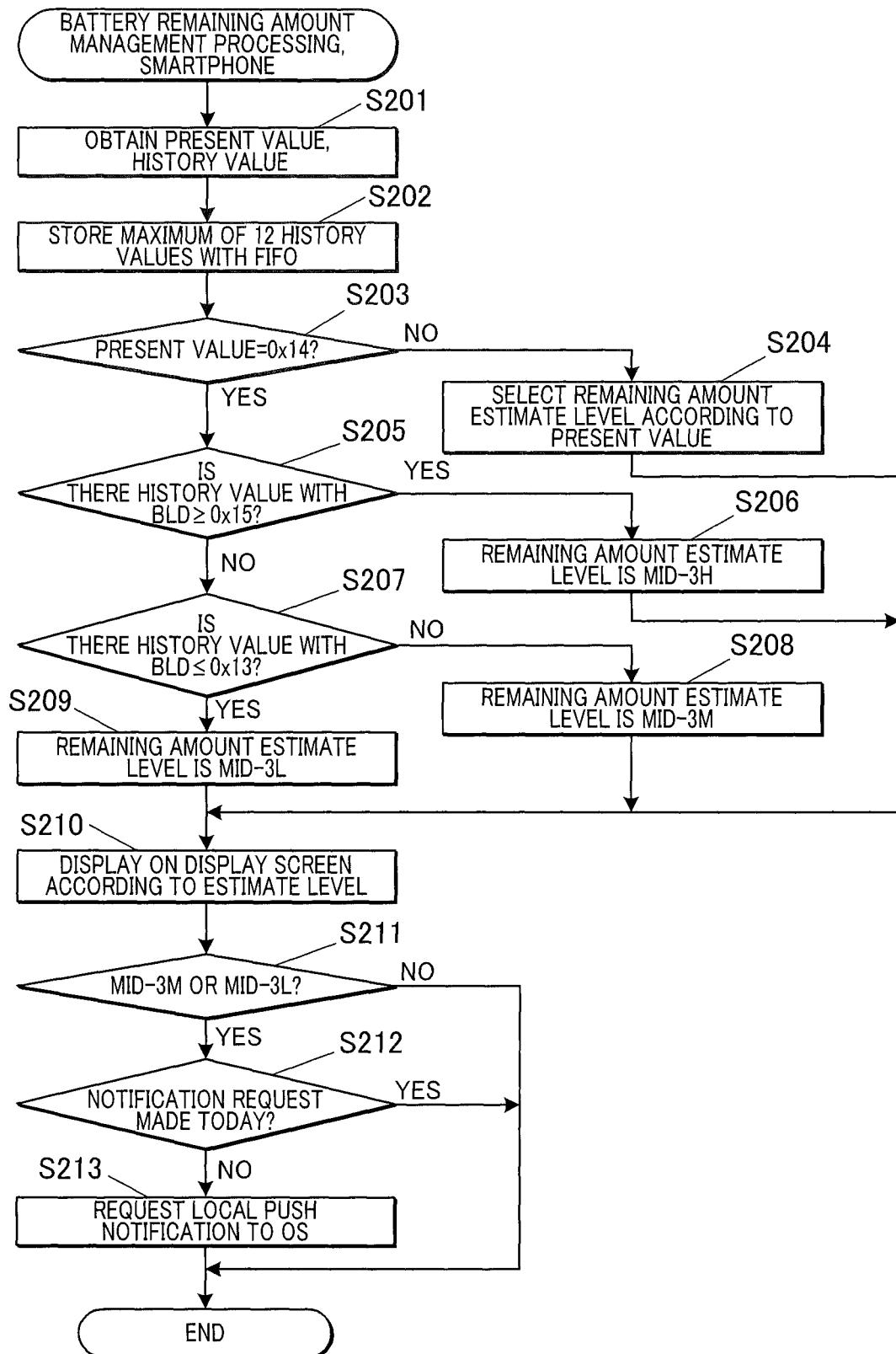
FIG. 7 is a flowchart showing a control procedure of battery remaining amount management processing performed based on a battery management application in the smartphone.

FIG. 7 is a flowchart showing a control procedure by the CPU 11 in the battery remaining amount management processing performed based on the battery management application 141 of the smartphone 10.

The battery remaining amount management processing is an embodiment of the battery remaining amount management method of the present invention, and starts when a start request is obtained from the electronic timepiece 40 or when the start instruction made manually based on the input operation to the operation receiving unit 47 by the user is detected.

When the battery remaining amount management processing starts, the CPU 11 obtains the present value regarding the output voltage of the battery 552 transmitted from the electronic timepiece 40 and the history information (step S201). The CPU 11 updates the battery history information 12 with the maximum of 12 latest BLDs including the obtained history information (step S202). That is, the CPU 11 stores all BLDs included in the obtained history information in the battery history information 142 and when the BLDs included in the obtained history information is less than 12, the newest BLDs which were obtained in the past when the information was obtained and stored in the battery history information 142 remain stored in the history information until the number of BLDs become 12 (trend obtaining array number).

The remaining amount obtaining step (remaining amount obtaining unit) is composed of steps S201, S202.

The CPU 11 determines whether the present value of the obtained BLD value is 0x14 (step S203). When it is determined that the value is not 0x14 ("NO" in step S203), the present value is 0x15 or more, and the CPU 11 selects the estimate level of the battery remaining amount according to the present value (that is, "FULL" to "MID-2") (step S204). Then, the processing by the CPU 11 advances to step S210.

When it is determined that the BLD value is 0x14 ("YES" in step S203), the CPU 11 determines whether the BLD value with 15x0 or more is included in the maximum of 12 BLD values included in the battery history information 142 (step S205). When it is determined that it is included ("YES" in step S205), the CPU 11 sets the estimate level of the battery remaining amount to "MID-3H" (that is, estimates the battery remaining amount) (step S206). Then, the processing of CPU 11 advances to step S210.

When it is determined that the value with 0x15 or more is not included in the values of the BLD included in the battery history information 142 ("NO" in step S205), the CPU 11 determines whether the BLD value which is 0x13 or smaller is included (step S208). When it is determined that it is not included, that is, all of the BLD values included in the battery history information 142 is 0x14 ("NO" in step S208), the CPU 11 sets the estimate level of the battery remaining amount to "MID-3M" (step S208). Then, the processing of CPU 11 advances to step S210.

When it is determined that there are BLD values which are 0x13 or less included in the battery history information 142 ("YES" in step S208), the CPU 11 sets the estimate level of the battery remaining amount to "MID-3L" (step S209). Then, the processing by the CPU 11 advances to step S210. The remaining amount estimate step (remaining amount estimating unit) is composed of the processing in steps S203 to S209.

When the processing advances from any one of steps S204, S206, S208, and S209 to step S210, the CPU 11 outputs the control signal to the driver 17 and displays on the display 16 a display according to the obtained estimate level of the battery remaining amount (step S210). The CPU 11 determines whether the estimate level is "MID-3M" or "MID-3L" (step S211). When it is neither of the above ("NO" in step S211), the CPU 11 ends the battery remaining amount management processing.

In the determining processing in step S211, when it is determined that the estimate level of the battery remaining amount is "MID-3M" or "MID-3L" ("YES" in step S211), the CPU 11 determines whether the notification operation request of step S213 is already made that day (unit notification term) (step S212). When the notification operation is already requested, that it, it is determined that it is the level "MID-3M" and "MID-3L" estimated for the second time or more that day (second or more estimate in the unit notification time) ("YES" in step S212), the CPU 11 ends the battery remaining amount management processing.

When it is determined that the notification operation is not already requested ("NO" in step S212), the CPU 11 requests operation to notify by local push notification that the remaining amount of the power amount of the battery 552 is lacking to the OS of the smartphone 10 (step S213). Examples of notification include, a direct warning that the remaining amount is lacking and/or request to charge the battery 552. Then, the CPU 11 ends the battery remaining amount management processing.

When the battery remaining amount management processing is started while the display is locked, the operation is performed in the background, and in this case, the display operation in the above processing does not have to be performed simultaneously. The estimate result can be called and displayed when the battery management application 141 is started and the communication connection with the electronic timepiece 40 is not made.

The display control step (display controller) is composed of processing in steps S211 and S213. The display controller may include the processing of step S212.

Figure 8:
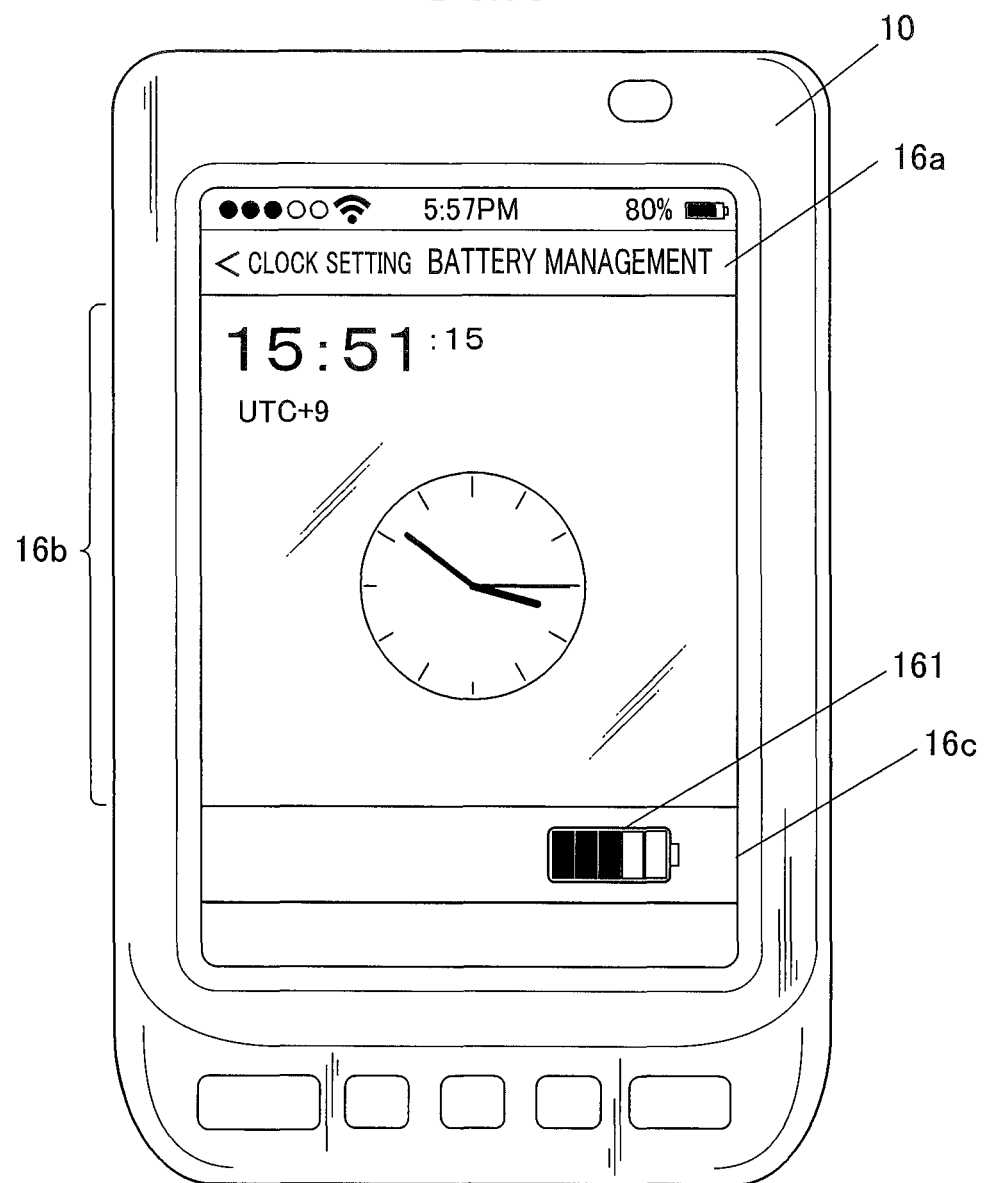
FIG. 8 is a diagram showing a display example on a display screen of a display of the smartphone.

FIG. 8 is a diagram showing a display example on a display screen of the display 16 of the smartphone 10.

When the battery management application 141 is on, there is a display showing that the battery management application 141 is being executed in an upper area 16*a* of the display screen of the display 16. In addition, the present time in the local time and the setting information regarding the time zone and summer time are displayed in a central area 16*b* based on the local time setting information of the electronic timepiece 40 held in the storage 14. A lower area 16*c* displays the display 161 according to the estimate level set regarding the battery remaining amount. When it is set so that the local time of the electronic timepiece 40 and the local time of the smartphone 10 are always synchronized, the display may directly use the date/time counted by the internal clock 15 of the smartphone 10 and its local time setting without referring to the local time setting information.

Figure 9:
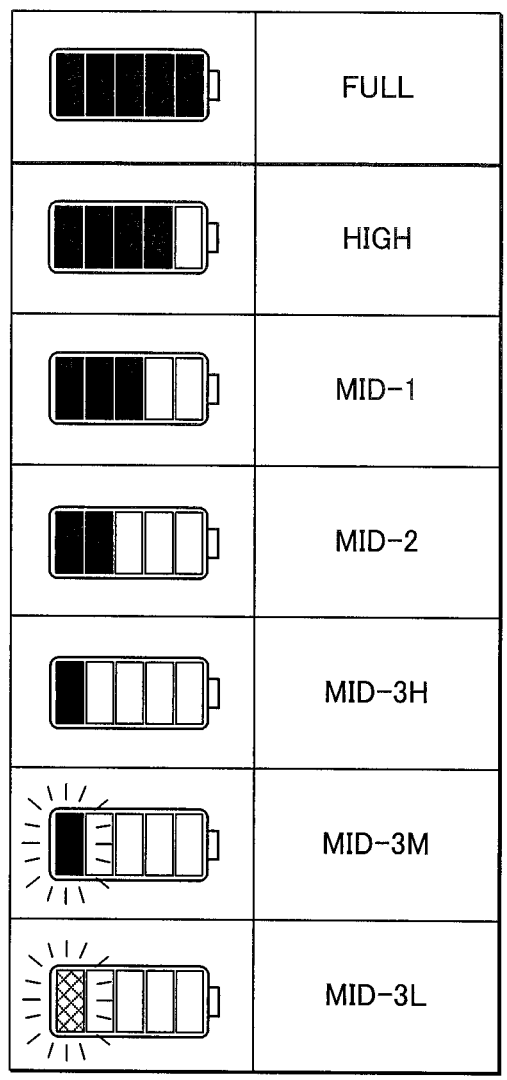
FIG. 9 is a diagram showing a setting example of a display regarding battery remaining amount.

FIG. 9 is a diagram showing a setting example of a display 161 regarding the battery remaining amount.

As described above, there are 7 estimate levels of the battery remaining amount set in the smartphone 10, "FULL" to "MID-2" and "MID-3H", "MID-3M", and "MID-3L", and the display pattern (display of battery remaining amount) is set according to each of the 7 levels in the battery management application 141. Here, 5 blocks are set in a frame in the shape of a battery, and the number of black blocks is larger when the battery remaining amount is larger.

Specifically, "MID-3" which is a classification by only the latest output voltage of the battery 552 is further divided (finely divided) in 3 levels (detailed level) based on changing tendency of the BLD value in the battery history information 142. At the "MID-3M" and "MID-3L" level, the colored block blinks to notify that there is a lack in the battery remaining amount and the operation will stop soon (here, both "MID-3M" and "MID-3L"). Further, the color may change to a different color (for example, red) (here, "MID-3L").

FIG. 10 is a diagram showing a display example of local push notification.

When the estimate level of the battery remaining amount is "MID-3M" and "MID-3L", the notification to the user that the battery remaining amount is lower than the reference remaining amount which shows the reference when it is necessary to urge the user to charge the battery is made not only by display when the application is started but also outside the application using the local push notification. That is, in the smartphone 10, even if the user does not start the application, when the necessity to charge the battery rises, a more reliable operation (predetermined display) to notify (display) to the user to urge the charging of the secondary battery 552*b* is performed. Such operation includes displaying the lack of the battery remaining amount as notification from the watch application on the notification list display screen 16*d* displayed on the display 16.

Here, according to the battery remaining amount, that is, when the estimate level is "MID-3M" and "MID-3L", the display content in the local push notification can be made different. For example, the display may be predetermined so that "charging will be necessary soon" may be shown for "MID-3M", and "charging is necessary" may be shown "MID-3L".

The notification operation is performed at a predetermined frequency, here, once a day, but the setting of the frequency can be changed by user operation. When the frequency of notification is set to a high value, if the BLD value decreases to 0x13 or lower and then returns to 0x14 during charging and does not reach 0x15, similar notification can be easily made.

Here, display regarding lack of battery remaining amount is not made in the electronic timepiece 40 including the battery 552. The information regarding the estimate level of the battery remaining amount set in the smartphone 10 may be transmitted to the electronic timepiece 40 by Bluetooth communication, and the CPU 41 of the electronic timepiece 40 may display the information on the display 16. The display method in such case may include, for example, pointing with a predetermined hand an index showing battery remaining amount is lacking provided on the plate with characters in advance, or blinking a segment showing lack of battery remaining amount provided in the digital display screen. When the predetermined hand showing the battery remaining amount is lacking is not the hand usually used to show the date/time, the display with the predetermined hand can be continued. When the display is performed using the hand used in the date/time display, the term of display may be a predetermined amount of time after the information of the estimate level is received, or the display may be canceled by a predetermined input operation by the user on the operation receiving unit 47.

As described above, the smartphone 10 of the first embodiment is an electronic device including a display 16 and a CPU 11. The CPU 11 obtains the battery history information 432 regarding the output voltage of the battery 552 in the electronic timepiece 40. The CPU 11 estimates the battery remaining amount which can be discharged by the battery 552 based on the obtained battery history information 432 (142). When the estimated battery remaining amount is less than a predetermined reference remaining amount, the CPU 11 controls the display 16 to perform a predetermined display.

As described above, the battery remaining amount is not directly estimated from the output voltage of the battery 552 at the point of time of measurement, and the battery remaining amount is estimated considering the past output voltage based on the battery history information 432 which is time series data regarding the output voltage of the battery 552 up to the present. Therefore, the accuracy of estimating the term of the battery remaining amount in which the output voltage does not drastically decrease from the characteristics of the secondary battery, that is, the point directly before the battery remaining amount lacks from the battery remaining amount being about the middle is enhanced. Therefore, it is possible to suitably display to the user that the battery remaining amount will lack before the battery remaining amount lacks.

When the output voltage of the battery 552 in the electronic timepiece 40 starts to decrease, before becoming lower than the final lower limit voltage, in order to at least keep the accurate date/time, the communication with the smartphone 10 becomes difficult or the normal display on the display 48 needs to be limited, for example, the operation of the hand showing each second needs to be limited. Therefore, it is possible to notify to the user by suitable display to perform charging before reaching the above state. With this, the user performs charging at the suitable timing, and stable operation is continued without limiting the functions in the electronic timepiece 40.

The battery history information 432 includes array data of the voltage level converting the measuring value of the output value for a plurality of times to voltage levels (0x18 to 0x11) set for each predetermined voltage range. The CPU 11 estimates the battery remaining amount based on the changing tendency of the voltage level in the battery history information 432 (142).

That is, by not directly using the output voltage value, the influence of the fine change of the output voltage value due to change in temperature, etc. is reduced. With this, the entire change of the output voltage can be seen easily and the battery remaining amount can be estimated. Since the two byte value is used, the size of the data for storage or transfer can be reduced.

The CPU 11 determines the detailed level (MID-3H to MID-3L) further dividing the voltage level corresponding to the latest measuring value of the output voltage based on the tendency of the change of the previous voltage level, and estimates the battery remaining amount according to the detailed level. That is, in the "MID-3" level in which the change of the output voltage is small compared to the power consumption, the battery remaining amount is assumed by not only the latest output voltage value but also by further dividing according to the tendency of the past voltage value. Therefore, the battery remaining amount can be obtained more suitably.

When the reference remaining amount to determine whether the remaining amount of the battery 552 lacks is included in the range of the battery remaining amount estimated according to the voltage level corresponding to the latest measuring value of the output voltage, that is, when in the "MID-3" level, the CPU 11 determines the "MID-3H" to "MID-3L" level. With this, it is possible to accurately divide between the "MID-3H" level in which charging is not so necessary and the "MID-3M" level or lower in which the necessity of charging rises. Therefore, the accuracy of starting display that the battery remaining amount lacks is enhanced.

When the reference remaining amount is included in the range of the battery remaining amount estimated according to the voltage level corresponding to the latest measuring value of the output voltage, that is, when the voltage level is 0x14, the CPU 41 determines whether the battery remaining amount is a reference remaining amount or more by whether the data of the voltage level higher than the voltage level 0x14 is 12 or less from the latest data of the voltage level in the battery history information 142 (432), that is, here, whether the data of the voltage level higher than the voltage level 0x14 is included in the number of pieces of data which can be held by the battery history information 142. That is, when 0x14 data which is a level in which the output voltage hardly changes compared to the increase of power consumption is included in the battery history information 142 together with the data of 0x15 or more, not much time has passed after entering the level in which the output voltage hardly changes. Therefore, although it is possible to judge that there is still time until the battery remaining amount lacks, when there is no more data of 0x15 or more, it is possible to judge that there is not much time until the battery remaining amount lacks. Therefore, by simply further dividing the voltage level 0x14 according to the latest output voltage value, it is possible to accurately determine whether the battery remaining amount is close to the lacking state.

When it is estimated that the battery remaining amount is less than the reference remaining amount a plurality of times in the same day, in the estimate which is the second time or more for that day, the CPU 11 does not request the display of the local push notification regarding the battery remaining amount lacking. Therefore, the display regarding the change within the day until the battery remaining amount actually lacks is not shown frequently and repeatedly to the user. Specifically, the display is performed at the timing first time each day that the battery remaining amount is estimated to lack. Therefore, the user may easily charge in the everyday operation, specifically, the charging can be performed during the day when charged with the solar panel.

A short distance communication module 24 is provided to perform wireless communication with the electronic timepiece 40, and the CPU 11 obtains the battery history information 432 of the battery 552 which supplies power for operation to the electronic timepiece 40 with the short distance communication module 24.

That is, the state of the battery 552 of the electronic timepiece 40 is obtained by the smartphone 10, analyzed and displayed. Therefore, it is possible to manage the remaining amount of the battery 552 more easily than the electronic timepiece 40 having a fine display and with which operation is difficult. Moreover, there is no need to enhance the performance of the CPU 41 and the RAM 43 of the electronic timepiece 40 more than necessary for conventional operation of a timepiece.

The CPU 11 obtains the battery history information 432 from the electronic timepiece 40 at least once a day which is shorter than 4 days which is the maximum obtainable time of the battery history information 432 in the electronic timepiece 40, and the battery remaining amount is estimated each time the battery history information 432 is newly obtained. That is, the output voltage information of the electronic timepiece 40 can be continuously obtained while suitably estimating the battery remaining amount of the electronic timepiece 40 at a necessary time interval and display can be performed.

When the data of a term shorter than 4 days which is the maximum obtainable time of the battery history information 432 from the electronic timepiece 40 is obtained, the CPU 11 generates the battery history information 142 for 4 days by combining the newly obtained battery history information 432, and a portion of the new information held as the battery history information 142 obtained previously. That is, the electronic timepiece 40 does not need to manage the update timing of the battery history information 432. The smartphone 10 is able to use the battery history information 142 regarding the measuring value of the output voltage for a suitable amount of time, that is, four days, to estimate the battery remaining amount.

The CPU 11 obtains the battery history information 432 from the electronic timepiece 40 at least in some occasions when the electronic timepiece 40 communicates to obtain the date/time information. By obtaining the battery history information 432 when communication is made for other purposes, the information of the voltage level can be obtained efficiently without increasing unnecessary burden of connecting and canceling communication. Specifically, when the date/time information is obtained to match periodic communication, the timing and frequency of obtaining can be determined stably and reliably.

The external device from which the battery history information 432 is obtained is the electronic timepiece 40. That is, as for a small electronic device such as the electronic timepiece 40 which continuously operates and in which a large difference of the consumed power within the day hardly occurs, the battery remaining amount can be easily and accurately estimated from the time series information of the voltage level. Therefore, by using the present invention more effectively, the display regarding the lack of the battery remaining amount can be performed suitably.

When the estimated battery remaining amount is less than the reference remaining amount, the CPU 11 performs the predetermined display according to each battery remaining amount level of "MID-3M" and "MID-3L". Therefore, the user is able to accurately acknowledge whether there is an urgent necessity to perform charging.

The CPU 11 displays the estimated battery remaining amount on the display 16. Therefore, the user is able to easily acknowledge not only when the battery remaining amount is near the lacking state, but also the degree of the battery remaining amount. Specifically, when it is displayed on the display 16 of the smartphone 10, the display is easy and a wide variety of expression is possible. Therefore, the user is able to easily understand the state of the battery remaining amount.

The battery 552 includes the secondary battery 552b, and when the battery remaining amount almost lacks, the display urges charging of the secondary battery 552b. Therefore, charging and preparation of charging can be performed at a suitable timing which is not right before the battery is empty and which is not too early.

The battery remaining amount management method by the smartphone 10 of the present embodiment including the display 16 includes a step to obtain the battery history information 432 including the time series array data regarding the output voltage of the battery 552, the step to estimate the battery remaining amount which the battery 552 can further discharge based on the obtained battery history information 432, and the step to control the display to perform predetermined display on the display 16 when the estimated battery remaining amount is less than a predetermined reference amount.

As described above, the estimate of the battery remaining amount is not performed only by a measuring value of the output voltage performed once, but is also performed based on the history. Therefore, the estimate of the battery remaining amount can be performed more accurately and suitably in the term from when the battery remaining amount is about the middle in which the change of the output voltage according to the increase of power consumption of the battery is small to right before the battery remaining amount lacks. Therefore, the display regarding the lack in the battery remaining amount can be made at a suitable timing before the battery remaining amount actually lacks. Consequently, the user charges the battery 552 before the remaining amount lacks and the operation of the electronic timepiece 40 continues reliably and stably.

The battery management application 141 is a program so that the computer (CPU 11) of the smartphone 10 including the display 16 performs the following functions. The battery history information 432 which is the time series array data regarding the output voltage of the battery 552 is obtained. The battery remaining amount which the battery 552 can discharge is estimated based on the obtained battery history information 432. When the estimated battery remaining amount is less than a predetermined reference remaining amount (estimated level is MID-3M or MID-3L), a request for local push notification is made to the OS and the display 16 is controlled to perform predetermined display.

Therefore, by installing the battery management application 141 in the smartphone 10, and by combining with the communication with the smartphone 10, here, the electronic timepiece 40 which can communicate by Bluetooth, the estimate accuracy can be enhanced in the term with the battery remaining amount in which the output voltage does not drastically decrease due to the characteristic of the secondary battery, that is, the term from when the battery remaining amount is about the middle to right before the battery remaining amount lacks. Consequently, the battery remaining amount of the electronic timepiece 40 can be suitably and easily managed. The charging of the battery 552 can be urged to the user at a suitable timing before the battery remaining amount of the electronic timepiece 40 lacks and the user can charge the battery 552. Therefore, the operation of the electronic timepiece 40 can be suitably continued without unnecessary burden.

The electronic timepiece 40 of the present embodiment includes a battery 552, a voltage detecting circuit 551 which measures the output voltage of the battery 552, a RAM 43 which stores as the battery history information 432 time series array data in the voltage level according to the output voltage measured in the voltage detecting circuit 551, a communication module 49 which performs wireless communication with the external device, a timekeeping unit 46 which counts the present date/time, a display 48 which displays date/time based on the present date/time counted by the timekeeping unit 46, and the CPU 41. The CPU 41 stores in the RAM 43 the time series array data of the voltage level according to the output voltage measured a plurality of number of times by the voltage detecting circuit 551 in a 8 hour interval as the battery history information 432 and when wireless communication is connected with the smartphone 10 by the communication module 49, the battery history information 432 is transmitted to the smartphone 10.

With this, the battery remaining amount can be managed in the smartphone 10 instead of the electronic timepiece 40, and the battery remaining amount can be managed easily. That is, specifically, in the electronic timepiece which is displayed by hands or in which display is simple using segments, a configuration does not need to be provided for a display regarding the remaining amount and the management of the battery.

Second Embodiment

Next, the electronic timepiece 40a of the second embodiment is described.

FIG. 11 is a block diagram showing a functional configuration of the electronic timepiece 40a of the second embodiment.

The electronic timepiece 40a has the same configuration as the electronic timepiece 40 of the first embodiment with the exception of the battery management program 422 being stored in the ROM 42a. The same configuration is described using the same reference numeral and the description is omitted.

The battery management program 422 is a program to perform processing corresponding to the battery management application 141 stored in the storage 14 of the smartphone 10 according to the electronic timepiece 40 of the first embodiment. That is, in the electronic timepiece 40a, the estimate level of the battery remaining amount is determined using the battery history information 432 only with the electronic timepiece 40a without using the smartphone 10, and display according to the determined estimate level is performed on the display 48.

Here, communication with the smartphone 10 by Bluetooth can be performed, and display operation according to classification can be performed parallel on both the electronic timepiece 40a and the smartphone 10. The operation of the smartphone 10 in this case can be the same as the electronic timepiece 40 of the first embodiment, or simply the information of the determined estimate level can be obtained from the electronic timepiece 40a to perform display or to make the request for display by local push notification that charging is necessary.

Figure 12A:
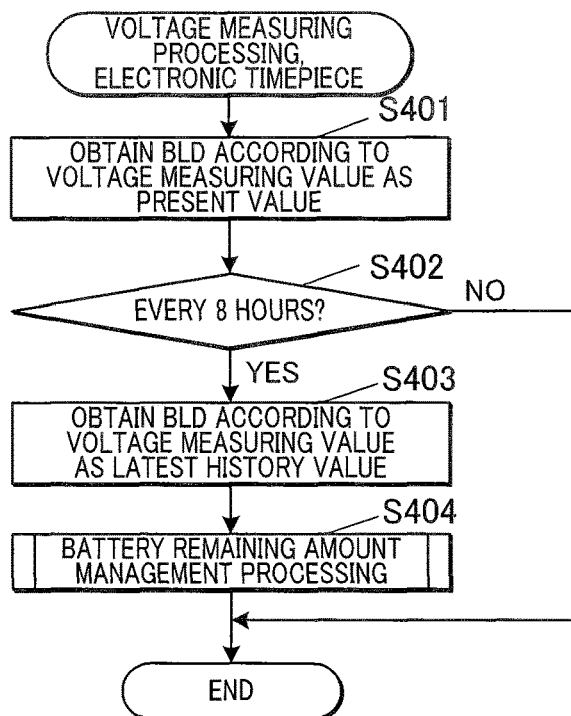
FIG. 12A is a flowchart showing a control procedure of a voltage measuring processing performed in the electronic timepiece of the second embodiment.

FIG. 12A is a flowchart showing a control process by the CPU 41 in the voltage measuring processing performed in the electronic timepiece 40a of the present embodiment.

Figure 12B:
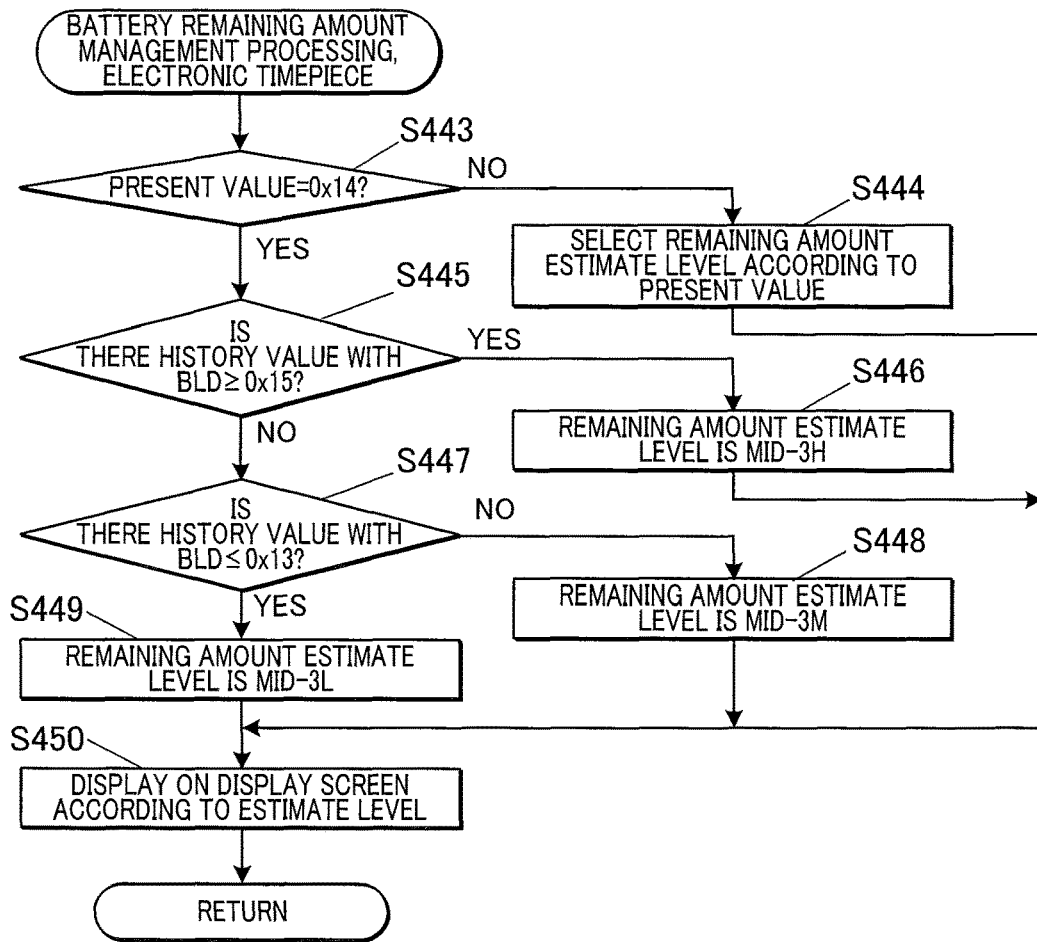
FIG. 12B is a flowchart showing a control procedure of a battery remaining amount management processing performed in the electronic timepiece of the second embodiment.

As shown in FIG. 12A, the voltage measuring processing is different only in the point that, after the processing of step S403, the CPU 41 calls and executes the battery remaining amount management processing as shown in FIG. 12B and the other points are similar to the electronic timepiece 40 of the first embodiment. The same reference numeral is applied to the same contents in the processing and the description is omitted.

The battery remaining amount management processing called in the processing of step S404 is performed by directly referring to the present value obtained and updated in the processing of steps S401 and S403, and the battery history information 432. The processing of steps S443 to S450 in the battery remaining amount management processing corresponds to the processing of steps S203 to S210 in the battery remaining amount management processing performed in the smartphone 10. The difference between the processing of step S444 and the processing of step S204 is described below.

In the processing of step S444, the CPU 41 selects the estimate level of the battery remaining amount corresponding to the present value (step S444). Here, the CPU 41 is able to obtain the value when the BLD value is smaller than 0x14 (0x13 to 0x11) in addition to when the BLD value is larger than 0x14, and the estimate level of the battery remaining amount is set to "LOW-1", "LOW-2", and "CHARGE" according to the BLD value.

In the electronic timepiece 40a, when the predetermined display operation is performed in the processing of step S450, similar to when the estimate level information is returned to the electronic timepiece 40 in the first embodiment, and the information is displayed on the electronic timepiece 40, for example, an index showing the battery remaining amount is lacking provided in advance on the character plate is pointed with the predetermined hand or the segment showing the battery remaining amount is lacking provided on the digital display screen is lit.

Different from such control of the display, based on the present value or the measurement value of the voltage value obtained in a shorter time interval (for example, every second) (or the converted BLD value), the executing of the display and function is limited when the output voltage is VL1 or lower. For example, when the output voltage is voltage VL1 or less, the CPU 41 moves the second hand of the display 48 every 2 seconds and the communication with external electronic devices (smartphone 10) by the communication module 49 is restricted. When the output voltage becomes less than voltage VC, all display is stopped and only the function of counting the present date/time is continued.

As described above, the electronic timepiece 40a of the second embodiment includes the battery 552, the voltage detecting circuit 551 which measures the output voltage of the battery 552, and the RAM 43 which stores the time series array data of the voltage level corresponding to the output voltage measured in the voltage detecting circuit 551 as the battery history information 432. The CPU 41 stores the time series information of the voltage level based on the measurement value of the output voltage by the voltage detecting circuit 551 in the RAM 43 as the battery history information 432, and estimates the battery remaining amount based on the battery history information 432 stored in the RAM 43.

As described above, the electronic timepiece 40a itself is able to estimate the battery remaining amount based on the time series information of the voltage level. Therefore, the user is able to understand the status of the battery remaining amount from the electronic timepiece 40a without using external devices such as the smartphone 10 before the battery remaining amount lacks more accurately than conventional methods. Therefore, charging can be suitably performed before the battery runs out.

According to the electronic timepiece 40a including the timekeeping unit 46 which counts the present date/time and the display 48 which displays the date/time based on the present date/time counted by the timekeeping unit 46, the above-described estimate and display of the battery remaining amount can be performed. Therefore, in such electronic device in which the change of the power consumption for each day is relatively small, the battery remaining amount can be accurately estimated and it is possible to display at a suitable timing that the battery remaining amount will almost lack.

The present invention is not limited to the above-described embodiment and various changes are possible.

For example, according to the above-described embodiment, the battery remaining amount is estimated based on the changing tendency of the voltage level after the measuring value is converted to the voltage level. Alternatively, the measuring value of the output value can be directly processed and analyzed to estimate the battery remaining amount. In this case, for example, analysis with a low pass filter may be performed on the change of the measuring value.

According to the present embodiment, only the voltage level according to the measuring value of the predetermined interval is held as the array data. Alternatively, the interval of measuring can be uneven. In this case, the obtaining timing of the data of the previous interval can also be held, and analysis can be performed by weighting according to the frequency of obtaining.

According to the above-described embodiment, only when the estimate level is "MID-3", the estimate level is further divided into "MID-3L", "MID-3M", and "MID-3H", but the estimate level can be further divided in other estimate levels also.

According to the above-described embodiment, level "MID-3M" and level "MID-3L" are separated but these do not have to be separated, or states in which these cannot be separated can be included. At least the level in which the lack of the battery remaining amount is not displayed (here, "MID-3H") and the level in which such display is made needs to be separated based on the time series information regarding the output voltage. Even when the level "MID-3M" and the level "MID-3L" are divided, different display for each level does not have to be made on the display 16.

According to the above-described embodiment, a suitable estimate level is obtained by finely classifying with the history of the measuring value (voltage level) the estimate level of the battery remaining amount according to the measuring value (voltage level) of the latest output voltage. However, the present invention is not limited to the above. For example, when the shift of the latest voltage level due to the change in the environment such as the temperature is clear, the estimate level different from the estimate level according to the latest voltage level may be obtained according to the history of the voltage level.

According to the above-described embodiment, when the latest voltage level is 0x14, the level is divided finely according to whether data of other voltage level is included in the battery history information 142, but the present invention is not limited to the above. For example, timing including data of other voltage levels (position in array) and other relations of the position can be considered.

According to the above-described embodiment, 12 pieces of voltage level data are used to estimate the battery remaining amount but the present invention is not limited to the above. For example, even if only 12 pieces of voltage level data for 4 days are held in the electronic timepiece 40, more voltage level data can be held in the smartphone 10 and the estimate of the battery remaining amount can be made with the above. For example, in the smartphone 10, voltage level data with a length according to the predetermined percentage (half, etc.) with respect to the assumed continuing time of the voltage level 0x14 may be held.

According to the above-described embodiment, the battery history information 432 is transmitted and received at the first timing of communication for that day regarding the date/time information obtaining operation and at the timing of manual connection, but the timing is not limited to the above. The battery history information 432 can be obtained each time connection for communication is made in the date/time information obtaining operation. As for the manual connection, the information may not be obtained if the battery management application 141 is not started in the smartphone 10. Alternatively, the battery history information 432 may be obtained when connection is made for other purposes.

According to the above-described embodiment, the battery history information 432 transmitted to the smartphone 10 is deleted, but 12 pieces of voltage level data can be held constantly. In this case, the electronic timepiece 40 transmits the battery history information 432 including the above 12 pieces of voltage level data each time to the smartphone 10, and in the smartphone 10, the received battery history information 432 is used in analysis as the battery history information 142 as is. When the number of pieces of voltage level data held in the smartphone 10 is different from (more than) the number of voltage level data held in the electronic timepiece 40, for example, the corresponding relation between the array data of the battery history information 432 in the electronic timepiece 40 and the array data of the battery history information 142 of the smartphone 10 need to be matched according to the time passed from the previous obtaining timing.

According to the above-described embodiment, the battery remaining amount of the battery 552 of the electronic timepiece 40 is estimated. The battery which is estimated is not limited to the electronic timepiece, and batteries of other electronic devices may be estimated. In such case, it is preferable that the change of the power consumption for each day is small in the electronic device. An example of such device includes a sensor which makes a measurement for a predetermined amount of time every day or constantly.

According to the above-described embodiment, the display of the estimate level is made, but the normal estimate level may not be displayed and the display may be made only before the battery remaining amount lacks.

According to the above-described embodiment, the smartphone 10 displays the lack of the battery remaining amount by local push notification, but the display is not limited to the above. When the display based on estimate of the battery remaining amount performed in the background can be displayed, similar display processing can be performed such as display an error on the system console of the window display screen. Alternatively, instead of a display interrupting regardless of what is being displayed, e-mail can be transmitted to notify to the user when the e-mail is received and displayed.

According to the above-described embodiment, the smartphone 10 is described as an example of the electronic device but the present invention is not limited to the above. The electronic device can be any device which can communicate with the external device such as the electronic timepiece 40 at a certain interval by Bluetooth and in which the user is able to acknowledge a notification regarding the lack of the battery remaining amount at a certain frequency. Examples of such devices include a tablet terminal or a cellular phone.

According to the above-described embodiment, the battery 552 includes the secondary battery 552b, and it is determined whether the secondary battery 552b needs charging and the result is displayed. Alternatively, a dry battery can be used instead of the secondary battery 552b, and the necessity of charging the dry battery (necessity of preparation of exchange) can be determined and displayed.

According to the above-described embodiment, Bluetooth communication is performed as the wireless communication, but a wireless communicator which performs wireless communication based on other communication standards can be employed.

According to the above-described embodiment, the CPU 11 (CPU 41) as the processor (controller) performs the entire processing to control the management of the battery remaining amount, but a portion of or the entire processing of the processor (controller) can be performed by a dedicated hardware circuit.

According to the above-described description, the storage 14 and the ROM 42a composed of a nonvolatile memory such as a flash memory are described as the computer-readable medium storing the battery management application 141 (battery management program 422) regarding the battery remaining amount management processing of the present invention. However, the present invention is not limited to the above. A Hard Disk Drive (HDD) or a portable recording medium such as a CD-ROM or DVD disk may be used as the computer-readable medium. A carrier wave can be applied to the present invention as a medium to provide the data of the program regarding the present invention through communication lines.

The specific details of the configuration, the control procedure, and the illustrated examples can be suitably changed without leaving the scope of the present invention.

Various embodiments of the present invention are described, but the scope of the present invention is not limited to the embodiments illustrated above. The scope of the present invention includes the attached claims and its equivalents.

This application is based upon and claims the benefit of priority from the prior Japanese Patent Application No. 2016-038915, filed Mar. 1, 2016, the entire contents of which are incorporated herein by reference.

What is claimed is:

1. An electronic device comprising:
a controller configured to:
obtain, in a first-in first-out manner, information regarding a plurality of output voltages of a battery measured in time series;
determine whether a value of a latest output voltage of the plurality of output voltages of the battery measured in time series is within a predetermined voltage value range;
in response to determining that the value of the latest output voltage of the plurality of output voltages of the battery measured in time series is within the predetermined voltage value range, estimate a battery remaining amount at one time which the battery is able to discharge based on a tendency of values of the remaining output voltages of the plurality of output voltages of the battery measured in time series to change from a higher value higher than the value of the latest output voltage to the value of the latest output voltage;
determine whether the battery remaining amount at one time estimated is less than a predetermined reference remaining amount; and
control a display to perform a predetermined display in response to determining that the battery remaining amount at one time estimated is less than the predetermined reference remaining amount.

2. The electronic device according to claim 1,
wherein in estimating the battery remaining amount at one time, the controller is configured to:
determine whether the value of the latest output voltage of the plurality of output voltages of the battery measured in time series is a predetermined output voltage;
in response to determining that the value of the latest output voltage of the plurality of output voltages of the battery measured in time series is the predetermined output voltage, determine whether the values of the remaining output voltages of the plurality of output voltages of the battery measured in time series is equal to or lower than the predetermined output voltage; and
in response to determining that the values of the remaining output voltages of the plurality of output voltages of the battery measured in time series is equal to or lower than the predetermined output voltage, estimate the battery remaining amount at one time to be a predetermined estimated remaining amount that is lower than the predetermined reference remaining amount.

3. The electronic device according to claim 2,
wherein the controller is configured to:
in response to estimating the battery remaining amount at one time to be the predetermined estimated remaining amount,
determine whether the display has been controlled to perform the predetermined display in a predetermined previous amount of time;
in response to determining that the display has been controlled to perform the predetermined display in the predetermined previous amount of time, control the display to not perform the predetermined display; and
in response to determining that the display has not been controlled to perform the predetermined display in the predetermined previous amount of time, control the display to perform the predetermined display.

4. The electronic device according to claim 1,
wherein the controller is configured to control a communication interface to wirelessly communicate with an external device to obtain, in the first-in first-out manner, the information regarding the plurality of output voltages of the battery measured in time series.

5. The electronic device according to claim 1,
wherein the controller is configured to:
obtain, in the first-in first-out manner, from an external device, information regarding one or more of the plurality of output voltages of the battery measured in time series at least once in each of a plurality of periods within a maximum time period; and
estimate the battery remaining amount at one time each time the information regarding one or more of the plurality of output voltages is newly obtained.

6. The electronic device according to claim 5,
wherein the controller is configured to obtain, in the first-in first-out manner, the information regarding the plurality of output voltages of the battery measured in time series by combining the information regarding the one or more of the plurality of output voltages of the battery measured in time series obtained in the first-in first-out manner.

7. The electronic device according to claim 4,
wherein the controller is configured to:
   control the communication interface to connect with the external device to wirelessly communicate with the external device for a predetermined purpose; and
   obtain, in the first-in first-out manner, the information regarding the plurality of output voltages of the battery measured in time series in at least some occasions when the connection is made with the external device to communicate for the predetermined purpose.

8. The electronic device according to claim 7,
wherein the controller is configured to control the communication interface to connect with an electronic timepiece as the external device.

9. The electronic device according to claim 1, further comprising:
   the battery;
   a voltage measuring circuit configured to measure the plurality of output voltages of the battery in time series; and
   a storage configured to store, in the first-in first-out manner, the information regarding the plurality of output voltages measured by the voltage measuring circuit,
   wherein the controller is configured to obtain, in the first-in first-out manner, the information regarding the plurality of output voltages of the battery measured in time series from the storage.

10. The electronic device according to claim 9, further comprising:
   a time keeping circuit configured to count present date/time,
   wherein, the controller is configured to control the display to display date/time based on the present date/time counted by the time keeping circuit.

11. The electronic device according to claim 1,
wherein the controller is configured to control the display to perform the predetermined display according to the battery remaining amount at one time estimated, in response to determining that the battery remaining amount at one time estimated is less than the predetermined reference remaining amount.

12. The electronic device according to claim 1,
wherein the controller is configured to control the display to display the battery remaining amount at one time estimated.

13. The electronic device according to claim 1,
wherein the battery comprises a secondary battery, and
wherein the predetermined display urges charging of the secondary battery.

14. A method comprising:
   obtaining, in a first-in first-out manner, information regarding a plurality of output voltages of a battery measured in time series in first-in first-out manner;
   determining whether a value of a latest output voltage of the plurality of output voltages of the battery measured in time series is within a predetermined voltage value range;
   in response to determining that the value of the latest output voltage of the plurality of output voltages of the battery measured in time series is within the predetermined voltage value range, estimating a battery remaining amount at one time which the battery is able to discharge based on a tendency of values of the remaining output voltages of the plurality of output voltages of the battery measured in time series to change from a higher value higher than the value of the latest output voltage to the value of the latest output voltage;
   determining whether the battery remaining amount at one time estimated is less than a predetermined reference remaining amount; and
   controlling a display to perform a predetermined display in response to determining that the battery remaining amount at one time estimated is less than the predetermined reference remaining amount.

15. A non-transitory computer-readable recording medium having a program stored thereon for controlling a computer to at least perform:
   obtaining, in a first-in first-out manner, information regarding a plurality of output voltages of a battery measured in time series;
   determining whether a value of a latest output voltage of the plurality of output voltages of the battery measured in time series is within a predetermined voltage value range;
   in response to determining that the value of the latest output voltage of the plurality of output voltages of the battery measured in time series is within the predetermined voltage value range, estimating a battery remaining amount at one time which the battery is able to discharge based on a tendency of values of the remaining output voltages of the plurality of output voltages of the battery measured in time series to change from a higher value higher than the value of the latest output voltage to the value of the latest output voltage;
   determining whether the battery remaining amount at one time estimated is less than a predetermined reference remaining amount; and
   controlling a display to perform a predetermined display in response to determining that the battery remaining amount at one time estimated is less than the predetermined reference remaining amount.

* * * * *